United States Patent [19]

Simpson et al.

[11] 3,847,328

[45] Nov. 12, 1974

[54] AUTOMATIC GO-AROUND CONTROL SYSTEM FOR AIRCRAFT

[75] Inventors: Robert D. Simpson; Jimmie H. Boone, both of Bellevue, Wash.

[73] Assignee: The Boeing Company, Seattle, Wash.

[22] Filed: Mar. 19, 1973

[21] Appl. No.: 342,345

Related U.S. Application Data

[62] Division of Ser. No. 221,958, Jan. 31, 1972, Pat. No. 3,801,049.

[52] U.S. Cl. ........ 244/77 A, 235/150.22, 343/108 R
[51] Int. Cl. ............................................. B64c 13/18
[58] Field of Search ... 235/150.22; 244/77 A, 77 D; 318/583, 584; 343/5 LS, 108 R

[56] References Cited
UNITED STATES PATENTS

| | | | |
|---|---|---|---|
| 3,327,973 | 6/1967 | Kramer et al. | 244/77 A |
| 3,578,269 | 5/1971 | Kramer et al. | 244/77 A |
| 3,652,835 | 3/1972 | Devlin et al. | 244/77 A X |

*Primary Examiner*—Trygve M. Blix
*Assistant Examiner*—Stephen G. Kunin
*Attorney, Agent, or Firm*—Conrad O. Gardner; Glenn Orlob

[57] ABSTRACT

The invention relates to a system utilizing a control law which generates appropriate pitch rotation and airplane climbrate commands from any initial airplane rate of descent during the approach. The system can provide automatic go-around control from any altitude during the approach.

13 Claims, 13 Drawing Figures

AUTOMATIC GO-AROUND CONTROL SYSTEM FOR AIRCRAFT

This invention is a division of application Ser. No. 221,958 filed Jan. 31, 1972, now U.S. Pat. No. 3,801,049, and relates to signal processing for automatic approach and landing of an aircraft and more particularly relates to a system for automatically controlling the pitch axis of an aircraft during an automatic go-around initiated during an approach or landing sequence.

Prior art control systems which fly an aircraft close to the landing runway and thereafter approach that runway and flareout for touchdown are available as exemplified by U.S. Pat. No. 3,327,973 to Kramer et al. However, such systems do not utilize an integral system which, upon command, will automatically rotate the airplane and establish a positive climb rate away from the landing runway. The automatic go-around control system described herein utilizes the same sensors and signal processing paths used during the approach so that operational status of the system is inherently provided to the pilot in terms of aircraft performance during the approach.

It is accordingly an object of the present invention to provide a pitch axis control system for providing smooth and accurate rotation of airplane pitch attitude and establishing a positive predetermined climb rate at any altitude during an approach to land.

It is a further object of this invention to provide a pitch axis control system which, as an integral part of an automatic glide slope acquisition or tracking system, eliminates the requirement for special tests or testing equipment to assure the operational integrity of the system by virtue of the common sensors and signal processing means.

The above and further objects are achieved in the present invention by signal processing means for coupling control signals to utilization means, e.g., the pitch axis control system which processing means employs a single set of control laws for signal processing during glide slope capture, tracking and utilizes the same sensors and circuits for the go-around maneuver.

Other objects, features and advantages of the present invention will become apparent from the following description read on the accompanying drawings, wherein:

FIG. 1 corresponds to FIG. 1 of U.S. Pat. No. 3,327,973 which is included for ready reference to assist in comparison of the system of the present invention with this prior art;

Turning now to the system of FIG. 1 which is representative of the prior art, a comparison therewith will be made with the system of FIG. 8 which is illustrative of the system of the present invention to bring out the features of the present system. The features of the present system may then become focussed upon and appreciated in the subsequent analysis from a signal processing standpoint and later system embodiment description which further explain and amplify how these features and resultant advantages are achieved in accordance with the present pitch axis control system.

Figure 1:
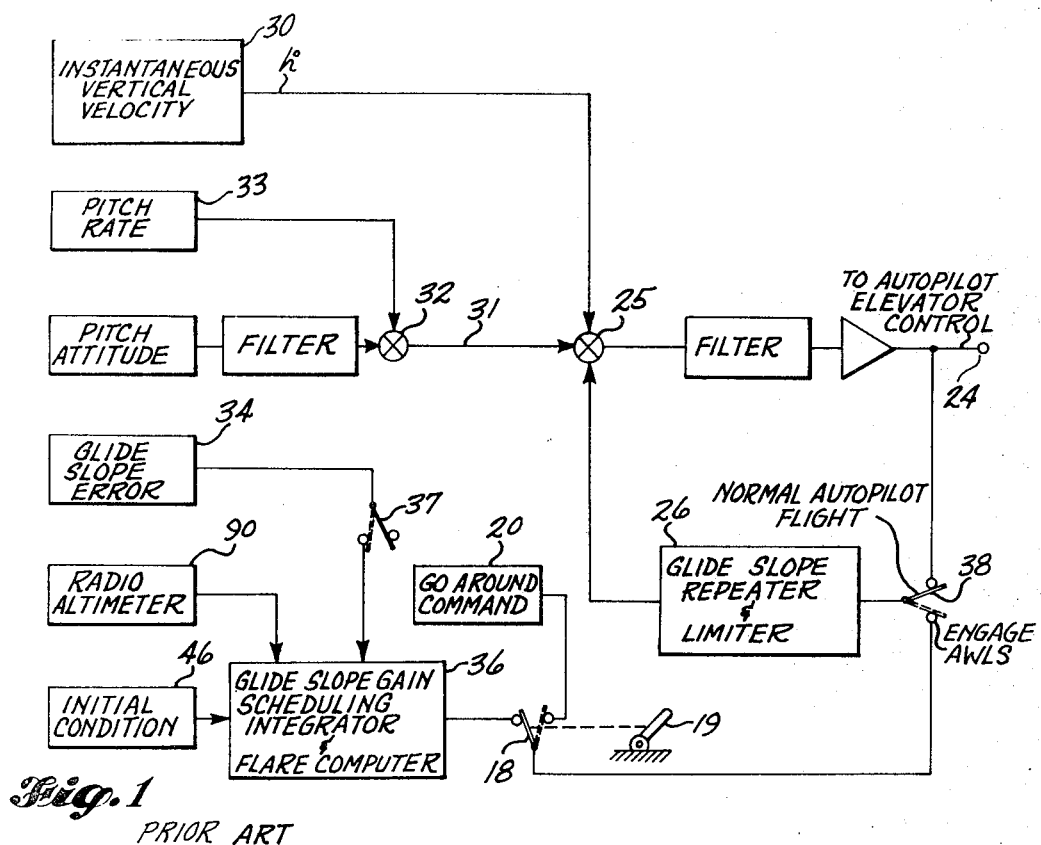
Figure 10:
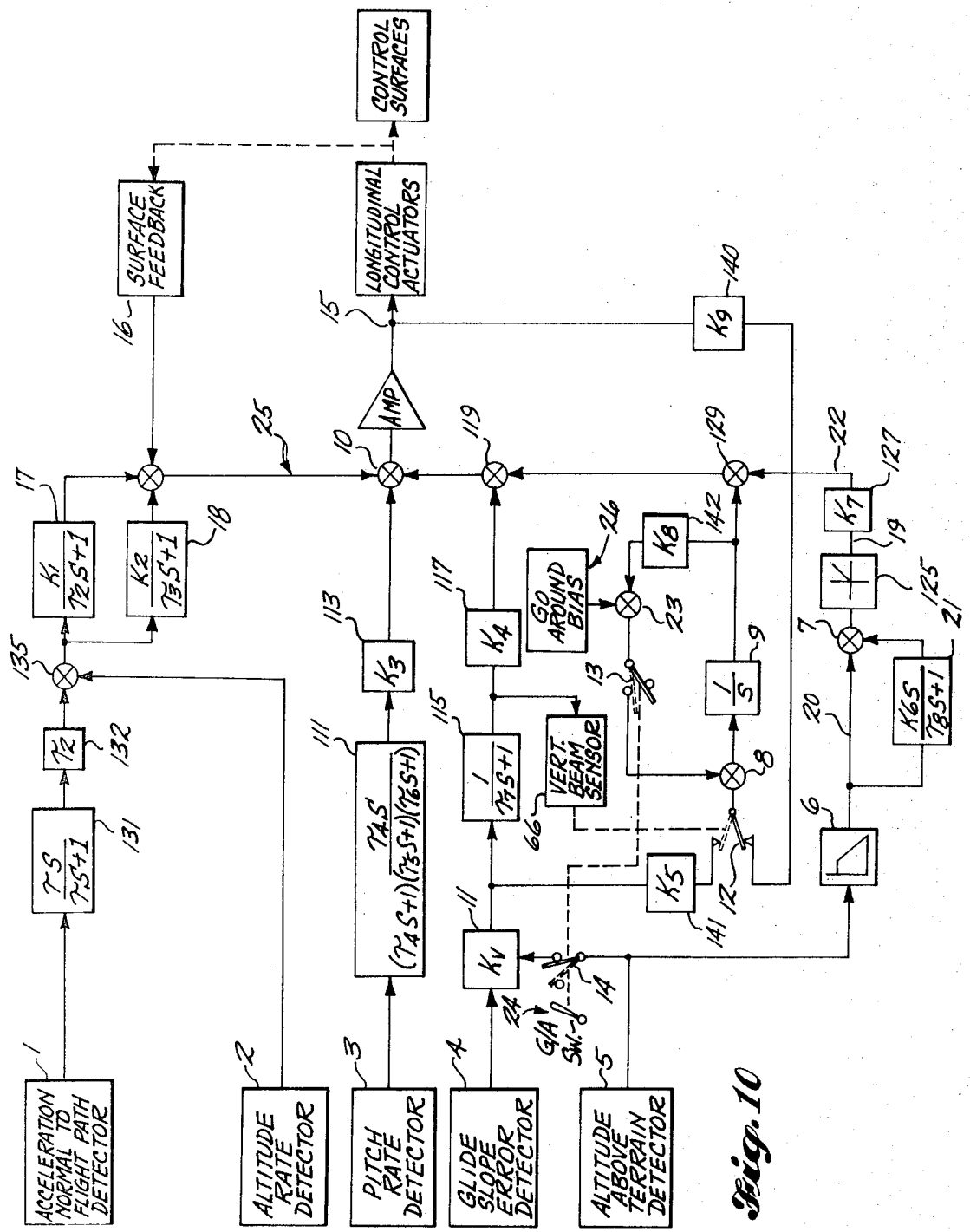
FIG. 10 is a block diagrammatic representation of an embodiment of a pitch axis control system according to the present invention.

The system of FIG. 1 provides a synchronized automatic capture of the glide slope error which depends upon pilot initiated computer input information based upon glide slope angle, approach speed, etc., which is only optimized for one set of environmental or airplane conditions and for one capture altitude while the present system of FIG. 10 provides a synchronized automatic exponential capture of the glide slope error independent of glide slope angle, approach speed, wind conditions, etc., which allows optimum performance under substantially any environmental or aircraft conditions for substantially any altitude of glide slope capture.

The system of FIG. 1 utilizes pitch attitude for minor loop stability resulting in looser control of the desired flight path in the presence of wind and tends towards less reliability due to the added sensor while the present system of FIG. 10 does not require the use of a pitch attitude source for minor loop stability thus allowing for more accurate control along the desired flight path and also eliminating the extra sensor reliability.

The system of FIG. 1 can be seen to utilize a vertical velocity computer to derive velocity errors relative to true vertical, not the desired flight path. The system also requires a longitudinal accelerometer for optimum compensation for wind conditions or airplane speed bleeds. The present system of FIG. 10 in contrast uses a normal accelerometer however tilted relative to the aircraft body axis (see FIG. 11 for more detail) to provide instantanious normal velocity errors relative to the desired flight path and to compensate for any longitudinal acceleration errors due to environmental conditions or aircraft speed bleeds. The present system further eliminates the need for a longitudinal accelerometer to compensate for these errors.

The system of FIG. 1 utilizes a vertical velocity computer which computes the vertical velocity and does not contain pitch rate information requiring both pitch rate and pitch attitude for minor loop stability, and further requires the monitoring of these sensors for automatic landings. The present system uses a normal accelerometer mounted forward of the aircraft center of gravity to provide a signal proportional to pitch acceleration which is passed through a lag filter to provide a pitch rate signal. The present system thus eliminates the pitch rate gyro as a critical sensor thus facilitating easier monitoring of the system.

The system of FIG. 1 utilizes a fixed vertical beam sensor switch point detector which is optimized for only one glide slope capture altitude and is much less acceptable for lower altitude glide slope captures while the present system of FIG. 10 utilizes a vertical beam sensor (switch point detector) that is downstream of the glide slope gain programmer. This allows optimum glide slope captures at substantially any altitude by varying the glide slope capture point inversely with altitude which is advantageous in noise abatement type approaches.

The present system embodiment of FIG. 10 provides an automatic go-around command as does the system of FIG. 1, however the system of FIG. 10 utilizes the same circuitry already utilized in FIG. 10 to perform other ILS coupling functions and has the following features and functional advantages over the system of FIG. 1:

a. If go-around circuitry fails, the system of FIG. 10 will flare the airplane allowing time for pilot correction at extremely low altitudes.
b. In the present system, the initial go-around command is independent of the final go-around command thereby allowing the aircraft to initiate go-around and assume positive rate of climb even if final command has failed.
c. The flare command is not inhibited by go-around which additionally reduces altitude loss at extremely low altitudes, and allows automatic go arounds even after the aircraft touches down.
d. The present system circuit design is such that no failure of the go-around command can result in an increased sink rate of the airplane after initiation of go-around.

The system of FIG. 1 does not provide automatic nose lowering after touchdown. The pilot is required to disengage the autopilot after touchdown and lower the nose to the ground manually prior to braking the aircraft while the present system of FIG. 10 provides automatic nose lowering after touchdown which allows the pilot to have the system engaged after touchdown and puts in nose down elevator to hold the aircraft on the ground after touchdown.

The present pitch axis system circuit embodiment implements the following 4 control equations:

1. The command path functions $$h_{(t)} = I_{o1} \left[ \frac{\alpha\omega_n[\xi + (\xi^2-1)^{1/2}] - 1)e^{-\omega_n[\xi - (\xi^2-1)^{1/2}]t} - (\alpha\omega_n[\xi - (\xi^2-1)^{1/2}] - 1)e^{-\omega_n[\xi + (\xi^2-1)^{1/2}]t}}{2\omega_n(\xi^2-1)^{1/2}} \right]$$

2. The aircraft short period damping function $$S_s = S_{so} + \tau_2 K_2(\dot{V}n_o - \dot{V}n) + \tau_2 K_2 < (\theta - \ddot{\theta}) + K_3(\dot{\theta}_o - \dot{\theta})$$

3. The flare command function $$-\Delta\dot{h} = (K_7/K_1)[h + h\, BIAS + K_6 \overset{\circ}{H} e^{-(t/\tau_8)}]$$

4. The go-around function for zero $\dot{h}$ error $$\dot{h}(t) = \overset{\circ}{h}_o e^{-t/tGA} + \overset{\circ}{h}_B(1 - e^{-t/tGA})$$

Figure 2:
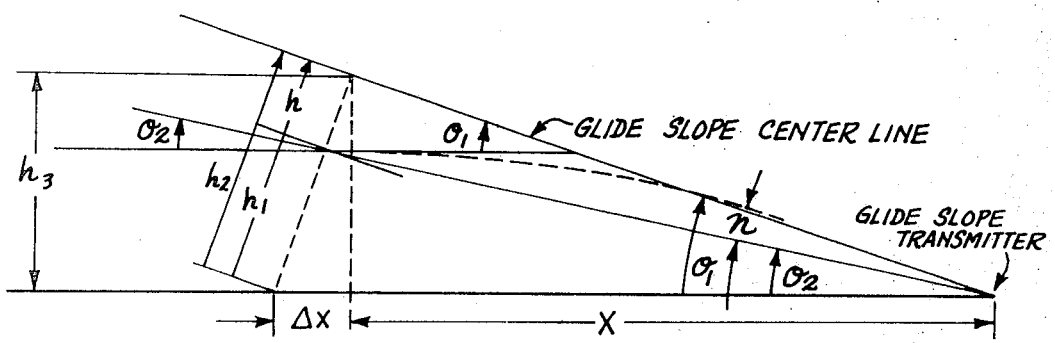
FIG. 2 is a diagram useful in showing geometric relationships of the aircraft in relation to the ground for developing the equations of flight path control of the system of the present invention.
Figure 3:
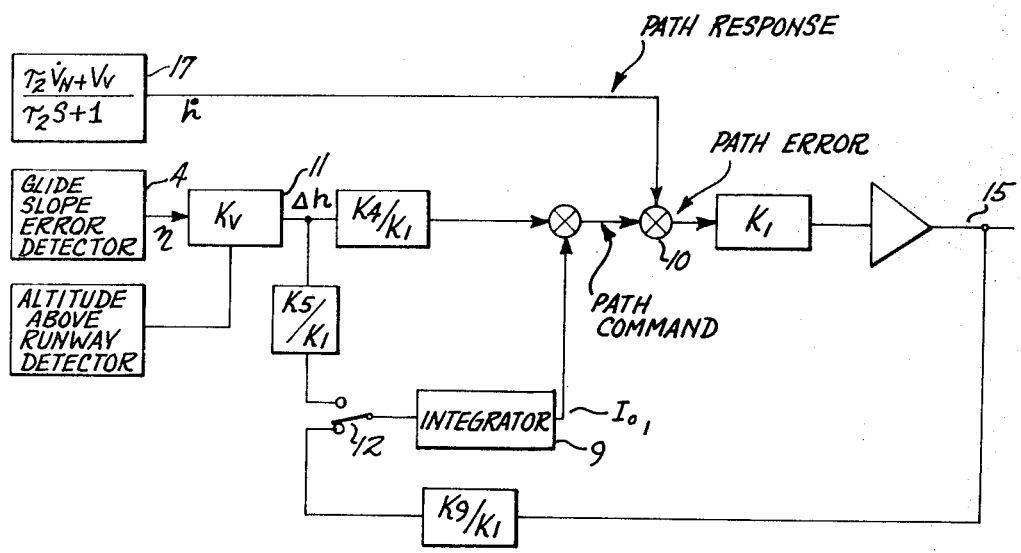
FIG. 3 is a block diagram showing signal processing utilized to derive aircraft path command signals in accordance with the system of the present invention deemed helpful in further development of the equations of flight path control of the system.

FIG. 2 showing aircraft relative position, viz., geometric representation of glide slope geometry and FIG. 3 showing in block form aircraft path command signal processing may now be considered in developing the path error and then path command signal terms of the present pitch axis control system where $\zeta$ = angular error of airplane from glide slope center as sensed by glide slope error detector
$\theta_1$ = glide slope center reference angle
$\theta_2 = \theta_1 - \zeta$
$h$ = distance from glide slope center and airplane receiving antenna perpendicular to glide slope center $h_1$ = distance from airplane receiving antenna and ground perpendicular to glide slope center
$h_2$ = distance from glide slope center and ground perpendicular to glide slope center
$h_3$ = vertical distance from glide slope center and ground
$\dot{h} = d/dt\,(h(t))$ $$\theta_1 - \theta_2 = \zeta$$

$h_1/(X+\Delta X) = \text{Sin}\,\theta_2$; $[h_1 th/(X+\Delta X)] = \text{Sin}\,\theta_1$ $h_1/X+\Delta X = \theta_2/57.3$ $[h_1+h/(X+\Delta x)] = \theta_1/57.3$ for $\theta < 6°$ $$\xi = 57.3\left[\frac{(h_1+h)-h_1}{x+\Delta x}\right] = \frac{57.3\,h}{x+\Delta x}$$

But $$X = h_3/\text{Tan}\,\theta_1$$

$$\Delta X = h_3 \tan\theta_1$$

And $$h_3 = g(X)$$

$$\zeta = 57.3\,h\,\text{Tan}\theta_a/h_3(1 + \text{Tan}^2\theta)$$

$h = \zeta\,h_3\,(1+\text{Tan}^2\theta_1)/57.3\text{Tan}\theta_1$ For $\theta_1 < 6°$ $1 + \text{Tan}^2\theta_1 = 1$ $h = \zeta\,h_3/\theta_1 = \zeta\,[f](h) = \zeta[g(X)]$ $h = k_v\,\zeta$ where $K_v = h_3/\theta_1$ Now Path Error $\Big|_{t=0} = \xi_{(o)}(K_v K_4/K_1)$ $+\overset{\circ}{h}_{(o)} - I_{o1} = 0 \Rightarrow I_{o1} = \xi_{(o)}\left(K_v \frac{K_4}{K_1}\right) + \overset{\circ}{h}_{(o)}$ Path Error $\Big|_{t=0^+} = \frac{K_4}{K_1}K_v\xi_{(t)} + \frac{K_5}{K_1}\int K_v\xi_{(t)}dt + \frac{dh_{(t)}}{dt} - I_{o1}$ But since $K_v\xi_{(t)} = h_{(t)}$ Path Error $\Big|_{t=0^+} = \frac{K_4}{K_1}h_{(t)} + \frac{K_5}{K_1}\int h_{(t)}dt + \frac{dh_{(t)}}{dt} - \frac{K_4}{K_1}h_o - \dot{h}_o$ Now mapping from time domain to $S$-plane and replacing $-\left(\frac{K_4}{K_1}h_o + \overset{\circ}{h}_o\right)$ with $I_o$ for simplicity Path Error $= \frac{K_4}{K_1}h_{(s)} + \frac{K_5}{K_1}\frac{h_{(s)}}{S} + Sh_{(s)} - h_o - \frac{I_{o1}}{S}$ where $$\mathcal{L}\left[\frac{dh_{(t)}}{dt}\right] = Sh_{(s)} - h_o;\ \mathcal{L}[I_o] = \frac{I_o}{S}$$

Path Error $= \frac{h_{(s)}}{S}\left(S^2 + \frac{K_4}{K_1}S + \frac{K_5}{K_1}\right) - \frac{I_{o1}}{S}\left(\frac{h_o}{I_o}S + 1\right)$ For zero path error, the path commanded relative to the glide slope zero plane is defined by:

$$h_{(s)} = \frac{I_{0_1}\left(\frac{h_o}{I_{0_1}}S+1\right)}{S^2 + \frac{K_4}{K_1}S + \frac{K_5}{K_1}}$$

This is in the form:

$$F(S) = I_{0_1}(\alpha S+1)/[S^2+2\zeta\omega_n S+\omega_n^2]$$

where:

$$\alpha = h_o/I_{0_1} \ ; \ 2\zeta\omega_n = K_4/K_1 \ ; \ \omega_n^2 = K_5/K_1$$

and $\zeta 0$ = damping; $(\omega_n)$ = natural frequency
Hence:

$$h_{(s)} = I_0\left[\frac{\alpha S}{S^2+2\zeta\omega_n S+\omega_n^2} + \frac{1}{S^2+2\zeta\omega_n S+\omega_n^2}\right]$$

Then $h(S)$ is in the form:

$$h_{(s)} = I_{0_1}\left[\frac{\alpha S}{(S+a)(S+b)} + \frac{1}{(S+a)(S+b)}\right]$$

$$h_{(t)} = \mathcal{L}^{-1}[h_{(s)}] = \mathcal{L}^{-1}\left[\frac{\alpha S}{(S+a)(S+b)}\right]$$

$$+ \mathcal{L}^{-1}\left[\frac{1}{(S+a)(S+b)}\right]$$

$$\mathcal{L}^{-1}\left[\frac{\alpha S}{(S+a)(S+b)}\right] = \frac{\alpha}{a-b}[ae^{-at}-be^{-bt}]$$

$$\mathcal{L}^{-1}\left[\frac{1}{(S+a)(S+b)}\right] = \frac{1}{b-a}[e^{-at}-e^{-bt}]$$

$$h_{(t)} = I_{0_1}\left[\frac{(\alpha a-1)e^{-at} - (\alpha b-1)e^{-bt}}{a-b}\right]$$

and $$S = -2\zeta\omega_n \pm \frac{[(2\zeta\omega_n)^2 - 4\omega_n^2]}{2}$$

$$= -2\zeta\omega_n \pm \frac{[4\omega_n^2(\zeta^2-1)]^{1/2}}{2}$$

$$= -\zeta\omega_n \pm \omega_n[\zeta^2-1]^{1/2}$$

Hence:

$$-a = +\omega_\zeta [\xi-(\zeta^2-1)1/2]$$
$$-b = +\omega_n[\xi+(\zeta-1)1/2]$$

and $$a-b = \omega_\zeta [\zeta-(\zeta^2-1)1/2-\zeta-(\zeta^2-1)1/2] = 2\omega_n(\zeta^2-1)1/2$$

Substituting into $h(t)$ $$h_{(t)} = I_{0_1}\left[\frac{(\alpha\omega_n[\xi+(\xi^2-1)^{1/2}]-1)e^{-\omega_n[\xi-(\xi^2-1)^{1/2}]t} - (\alpha\omega_n[\xi-(\xi^2-1)^{1/2}]-1)e^{-\omega_n[\xi+(\xi^2-1)^{1/2}]t}}{2\omega_n(\xi^2-1)^{1/2}}\right]$$

Figure 4:
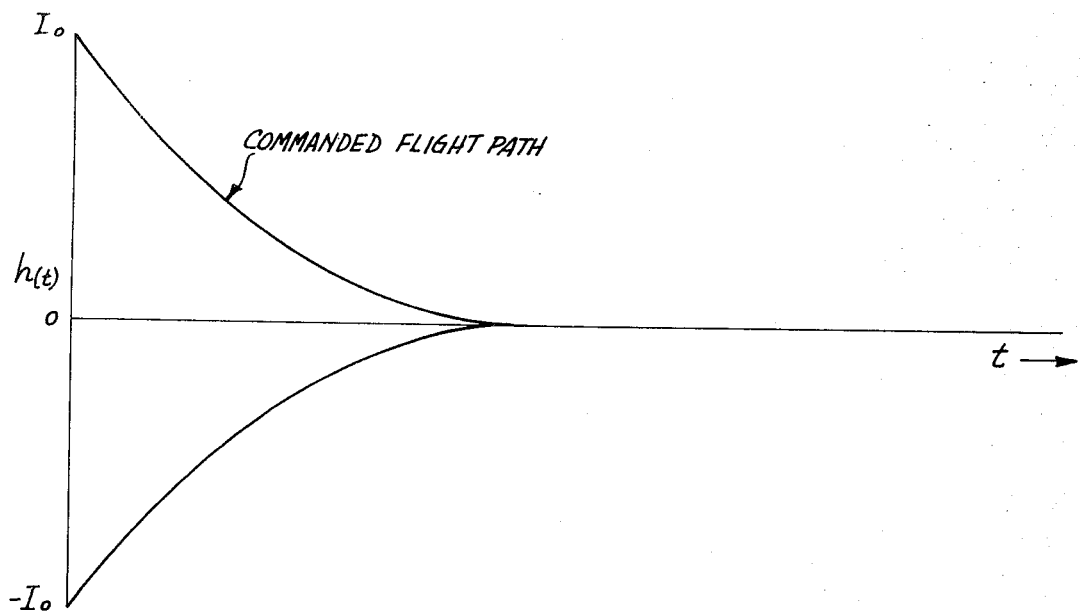
FIG. 4 is a graph showing commanded flight path as a function of a time subsequent to glide slope capture further helpful in understanding the derived equation for commanded flight path.

The above path command equation $h_{(t)}$ in terms of time constants, natural frequency and damping is seen to result in a glide slope capture which is always exponential (see FIG. 4) and which is always entered tangentially determined by $1_o$.

Figure 5:
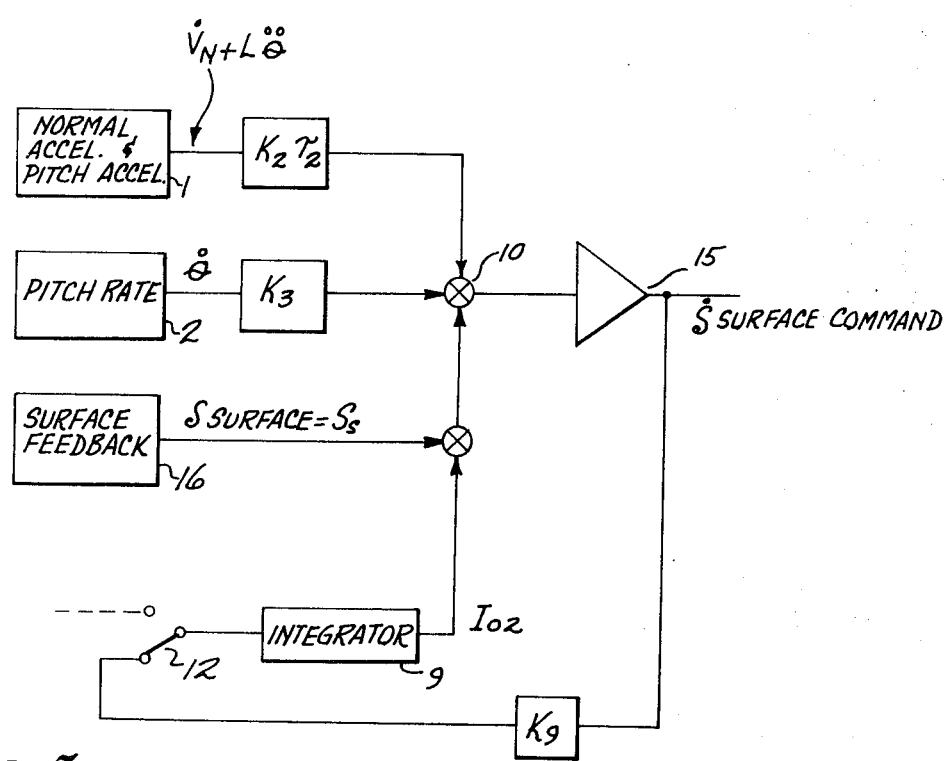
FIG. 5 is a block diagram representative of signal processing for aircraft short period damping satisfied in the system of the present invention.

Turning now to the position of the system providing short period damping shown in FIG. 5 the surface command equations are developed in the following:

$$\mathcal{L} \text{ Surface}\bigg|_{t=0} = (\mathring{V}_{N_o}+L\mathring{\mathring{\theta}})K_2\tau_2 + \mathring{\theta}_o K_3 + \mathcal{L}_{B_o} - I_{0_2} = 0$$

$$\Rightarrow I_{0_2} = \mathring{V}_{N_o}K_2\tau_2 + L\mathring{\mathring{\theta}}K_2\tau_2 + \mathring{\theta}_o K_3 + \mathcal{L}_{B_o}$$

$$\mathcal{L} \text{ Surface}\bigg|_{t=+0} = \mathring{V}_N K_2\tau_2 + L\mathring{\mathring{\theta}}K_2\tau_2 + \mathring{\theta}K_3 + \mathcal{L}_B - I_{0_2}$$

$\mathcal{L}$ Surface = 0 for Airplane Damping Satisfied:

$$0 = \mathcal{L} \text{ Surface}\bigg|_{t=10} = \tau_2 K_2(\mathring{V}_N - \mathring{V}_{N_o})$$

$$+ \tau_2 K_2 L(\mathring{\mathring{\theta}} - \mathring{\mathring{\theta}}_o) + K_3(\mathring{\theta} - \mathring{\theta}) + \mathcal{L}_B - \mathcal{L}_{B_o}$$

$$\mathcal{L}_B = \mathcal{L}_{B_o} + \tau_2 K_2(\mathring{V}_{N_o} - \mathring{V}_N) + \tau_2 K_2 L(\mathring{\mathring{\theta}}_o - \mathring{\mathring{\theta}}) + K_3(\mathring{\theta}_o - \mathring{\theta})$$

Normally at glide slope capture, the terms $\mathring{V}_{No}$, $\mathring{\mathring{\theta}}_o$ AND $\mathring{\theta}_0$ are very small and can be neglected therefore:

$$L_s = L_{s_o} + \tau_2 K_2 \mathring{V}_N + \tau_2 K_2 L \mathring{\mathring{\theta}} + K_3 \mathring{\theta}$$

Figure 6:
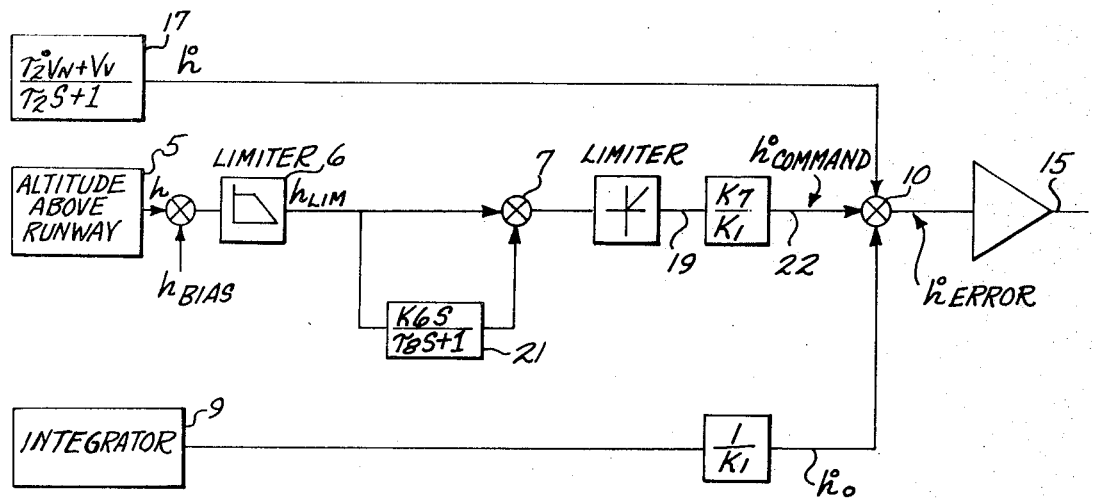
FIG. 6 is a block diagram illustrative of signal processing of the present system during the flare command phase of landing of the aircraft.

For flare command, the signal processing elements of the system are shown in FIG. 6 which results in flare command signals derived as follows:

$$\mathring{h}\text{ERROR} = \mathring{h}^\circ + \mathring{h}_o^\circ + \mathring{h}^\circ\text{COMMAND} \quad \text{SINCE } k_v = 0$$

Where $$\mathring{h}_{\text{Command}}\bigg|_{\frac{-K_6\mathring{h}e^{-t/\tau_8}}{h+h_{\text{Bias}}} \leq 1;} = 0 \quad t=0 \text{ for } h_{\text{Lim}} - (h+h_{\text{Bias}}) \leq 0$$

$$\mathring{h}_{\text{Command}}\bigg|_{\frac{-K_6\mathring{h}e^{-t/\tau_8}}{h+h_{\text{Bias}}} > 1} = \frac{K_7}{K_1}[h+h_{\text{Bias}}+K_6\mathring{h}e^{-t/\tau_8}]$$

$$\mathring{h}_{\text{Error}}\bigg|_{\frac{K_6\mathring{h}e^{-t/\tau_8}}{h+h_{\text{Bias}}} \leq 1} = \mathring{h}+\mathring{h}_o = \mathring{h} = -\mathring{h}_o$$

For zero Path Error $$\mathring{h}_{\text{Error}}\bigg|_{\frac{K_6\mathring{h}e^{-t/\tau_8}}{h+h_{\text{Bias}}} > 1} = \mathring{h}-\mathring{h}_o + \frac{K_7}{K_1}[h+h_{\text{Bias}}+K_6\mathring{h}e^{-t/\tau_8}]$$

$$\mathring{h}_{\text{Error}}\bigg|_{\frac{K_6\mathring{h}e^{-t/\tau_8}}{h+h_{\text{Bias}}} > 1} = \Delta\mathring{h} + \frac{K_7}{K_1}[h+h_{\text{Bias}}+K_6\mathring{h}e^{-t/\tau_8}]$$

And for zero path error:

$$\Delta\mathring{L} = \frac{K_7}{K_1}[h+h_{\text{Bias}}+K_6\mathring{h}e^{-t/\tau_8}]$$

Figure 7:
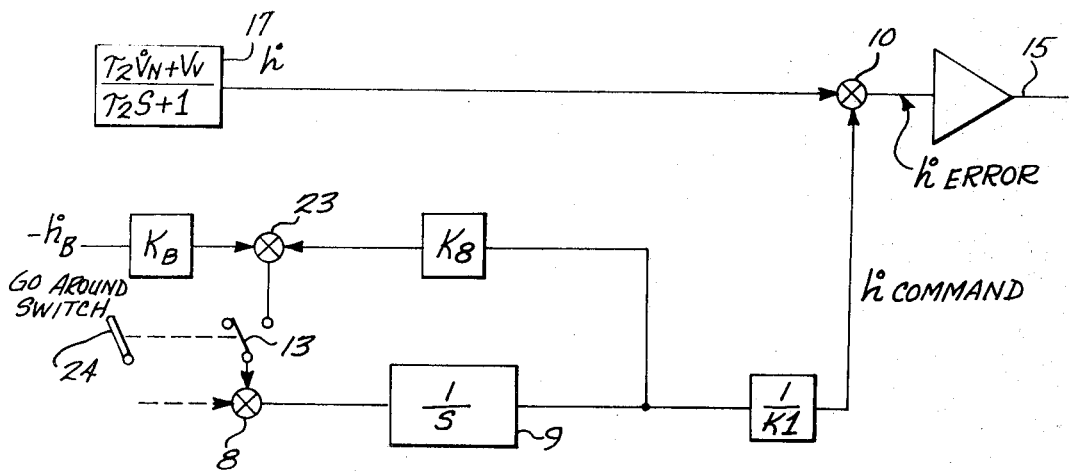
FIG. 7 is a block diagram showing system signal processing during the go-around phase.

Turning now to FIG. 7, the following derivations show how go-around equations representative of these signals are developed by the portion of the system shown in FIG. 7:

$$\mathring{h}_{\text{Error}}\bigg|_{t=-0} = \mathring{h}_{(t)} + \mathring{h}_{\text{Command}(t)} = 0 \Rightarrow \mathring{h}_{\text{Command}(o)} = -\mathring{h}_o$$

$$\mathring{h}_{\text{Command}}\bigg|_{t=0} = \left[\frac{-K_8\mathring{h}_o}{S}\right]\left[\frac{\frac{1}{K_8}S}{\frac{1}{K_8}S+1}\right] \quad \text{—Step inputs when switch 13 closed at go-around}$$

$$- \left[\frac{K_8\mathring{h}_B}{S}\right]\left[\frac{\frac{1}{K_8}}{\frac{1}{K_8}S+1}\right]$$

$$\mathring{h}_{\text{Error}}\bigg|_{t=+0} = \mathring{h}_{(t)} - \mathring{h}_o e^{-t/\tau_{GA}} - \mathring{h}_B(1-e^{-t/\tau_{GA}})$$

Where $\tau GA = 1/K_8$
FOR ZERO $\mathring{h}$ ERROR $$\mathring{h}(t) = \mathring{h}_{oe}^{-t/\tau_{GA}} + \mathring{h}_B^\circ(1-e^{-t/\tau_{GA}})$$

Figure 8:
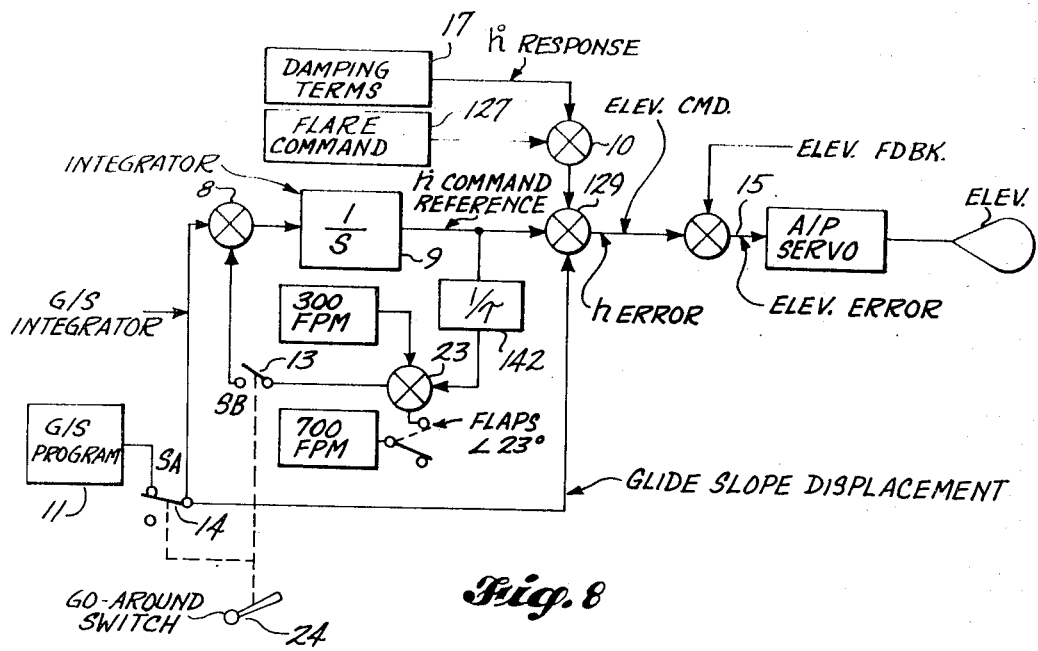
FIG. 8 is a block diagram similar to FIG. 7 however in a more detailed aircraft environment.
Figure 9:
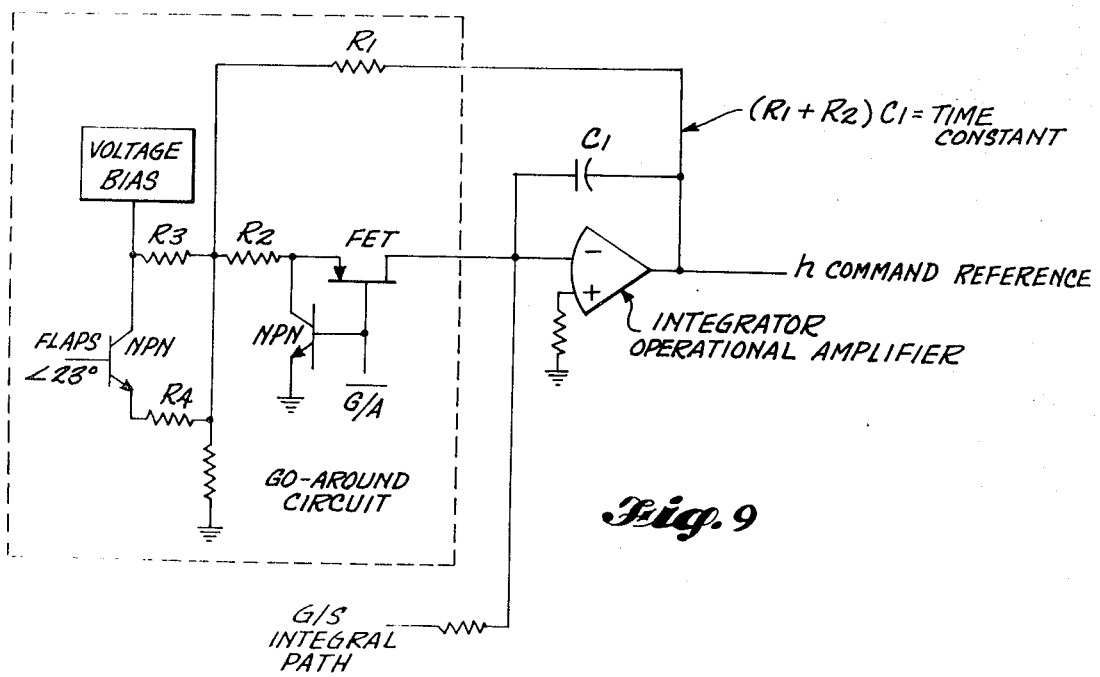
FIG. 9 is an exemplary circuit embodiment of the go-around systems of FIGS. 7 and 8.

While the system portion shown in FIG. 7 and the above equations define the go-around command signals generated the explanation which follows in connection with FIGS. 8 and 9 will further serve to explain in a more physical sense and in a complete circuit schematic respectively how the go-around function is achieved in the aircraft environment.

From the preceding block diagram and discussion, it should be noted that the automatic go-around command used in the present autopilot approach system is not automatically initiated but requires pilot activation of the go-around switch of FIG. 8 (correspondingly switching means 24 of FIG. 7 comprising a switch) which is preferably located on the throttle levers. If during an approach, the flight crew decides that conditions are not adequate to continue the approach, e.g., traffic on the runway, or inadequate visibility for landing, the pilot can initiate an automatic go-around by increasing the thrust and activating the go-around switch. This action will cause the autopilot to command the airplane to fly a programmed rate of climb. The programmed rate of climb is generated in the form of first and second signal components as follows:

1. The first signal component generated in the go-around portion of the system as shown in FIG. 8 commands a climb rate of 300 feet per minute. The h° error signal which is proportional to elevator command, can be seen to be composed of three terms prior to go-around which are:
  PRIOR TO FLARE
    1. G/S displacement (short term h° command) programmed to zero at 65 feet
    2. G/S integral (h° command reference)
    3. h° response (damping terms)
  DURING FLARE
    1. flare command (held at zero output until an altitude of approximately 53 feet)
    2. G/S integral (h° command reference)
    3. h° response (damping terms)
2. The second signal component generated by the go-around portion of the system shown in FIG. 7 is the term which actually causes the aircraft to perform an automatic go-around. This term (h° command reference) is proportional to the aircraft rate of sink when the aircraft is conducting an approach since when the aircraft is flying zero glide slope error (on glide slope centerline) the output of the integrator circuit 9 must be equal and opposite to the h° response of the damping terms of lag filter 17 to null out the h° error and fly a zero elevator command. This h° command reference is a fly down command so that the aircraft is descending at approximately 600 to 700 feet per minute on the centerline of the glide slope. When the pilot initiates an automatic go-around by pushing the go-around switch 24 (see FIG. 8), two events occur: first, the glide slope displacement and integral input paths are removed by switch $5_A$ so that no reference to the glide slope centerline is maintained during the go-around. This in itself does not cause any go-around command to be generated but causes the circuitry to maintain an h° hold command (a fixed output on the integrator circuit since the input to the integrator is zero) prior to flare or if in flare (at less than an altitude of about 53 feet) to continue to flare the aircraft due to the flare command. The second event occurs simultaneously with the closing of a resistive circuit path 142 via switch $S_B$ around the integrator circuit which washes out the glide slope integrator generated signal, h° command reference. Since the output of the integrator circuit is a fly down command, washing out or elimination of the integrator output signal is representative of a fly up command having a time constant determined by the RC network formed by the switched resistive circuit path and the capacitor providing the integrator feedback. For a Boeing Airplane Company type 747 aircraft, this time constant equals approximately 4.5 seconds but is dependent upon the particular aircraft characteristics. This function causes the aircraft to break its rate of sink. In addition as can be seen in FIG. 8, a voltage bias is summed in through a resistive network (not shown) to cause the aircraft to initially seek a climb rate of 300 feet per minute.

A second phase in go-around occurs after closing of switches $S_A$ and $S_B$ when the aircraft's flaps are raised to less than 23° to provide the go-around flap setting thereby switching in an additional gain path from the voltage bias and causing the lag circuit to command an additional 700 feet per minute climb rate for a total command rate of 1,000 feet per minute.

An actual exemplary embodiment of the go-around system of FIGS. 7 and 8 is shown in FIG. 9. If the go-around is initiated below 53 feet (flare region) or just prior to 53 feet and the aircraft enters the flare region, the flare computer will also command a decrease in rate of sink which aids the go-around command and allows the automatic go-around to be used safely at very low altitudes including after touchdown. Automatic nose lowering after touchdown is provided in the present pitch axis control system which system does not utilize pitch attitude as a damping term but in which primary damping is dependent on altitude rate. At touchdown, the flare command is requesting a sink rate of 2.5 to 3 feet per second. When the aircraft lands, the aircraft sink rate is reduced to zero in a very short time interval which produces an error between the actual sink rate of zero and the commanded sink rate of 2.5 to 3 feet per second. This results in a nose down elevator command effort for providing an increase in sink rate to 2.5 to 3 feet per second. The present pitch axis control system damping permits this maneuver in a controlled manner. Prior art systems which utilize pitch attitude for damping cannot generate sufficient altitude rate error at touchdown to lower the nose, hence the pilot must disconnect the control system and lower the nose manually.

Turning now to FIG. 10, there is shown the complete control system which provides the several function, e.g., flare command, go-around, etc., already separately discussed. In the following discussion reference numerals corresponding to those used earlier will be used to identify corresponding elements of the system.

Figure 11:
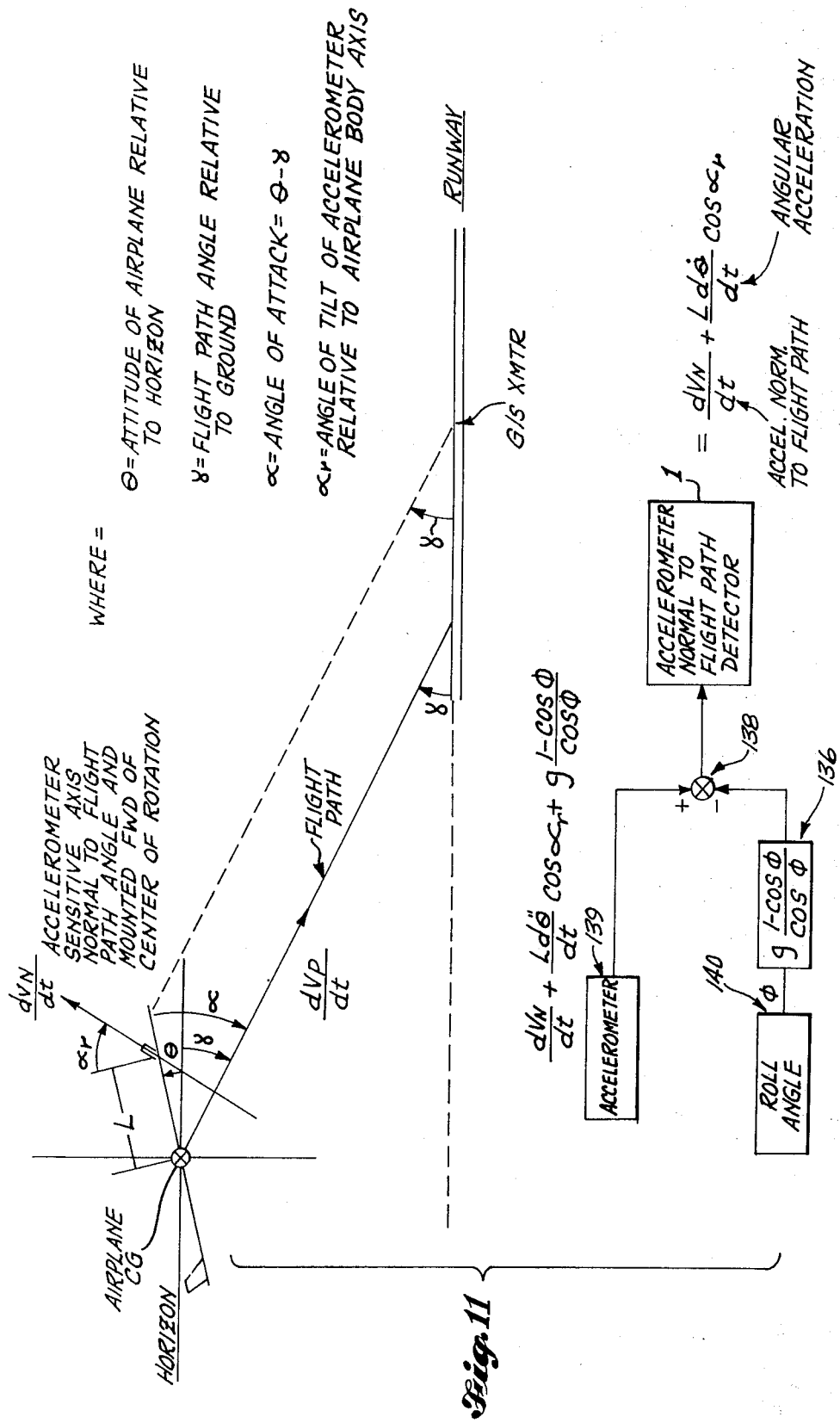
FIG. 11 shows in more detail the acceleration normal to flight path detector of FIG. 8.

In the system of FIG. 10, between the system output terminal 15 and the summing junction 10 there is coupled a negative feedback loop. This negative feedback loop comprises the glide slope integrator 9 connected through switching means 12 comprising a relay switch in the position shown and series gain 140 for providing a synchronizing path. This synchronizing path provides two functions when operating in the synchronizing mode. The first function is for reducing signals present at the system output terminal 15 to reference potential (zero) by driving glide slope integrator circuit 9 so that the output signal voltage of integrator circuit 9 is substantially equal and opposite to the sum of the remaining signal voltages at summing junction 10. In this manner, the pitch axis control system output signal at computer system output terminal 15 is maintained at reference potential (zero voltage level) to assure that no undesirable aircraft maneuver is experienced at the time of engagement of the automatic approach and landing computer of the present pitch axis control system. The second function of the synchronizing path is for providing glide slope capture initial conditions so that when the present automatic approach and landing pitch axis control system is engaged by closing switching means 12 to the dotted line position, the present system will maneuver the aircraft onto the glide slope zero plane. This function is accomplished in a unique and novel manner without having to switch in a separate signal generating means and by utilizing the same control laws previously derived which also provide the glide slope zero plane tracking. Since the glide slope integrator circuit 9 has stored at its output, a signal voltage which is equal and opposite to the sum of all other signal voltages appearing at the input of summing junction 10, and, for a glide slope capture from a point below the glide slope zero plane, this stored output contains a signal which is equal and opposite to the fly up command from the glide slope error detector 4 through the variable glide slope gain programmer circuit 11. Circuit 11 comprises means well-known in the art for multiplying two variables together, e.g., pulse width modulated shunt switching means. At a fixed error signal level from the glide slope zero plane, the vertical beam sensor 66, threshold is exceeded causing switching means 12 to transfer and thus removing the output signal at terminal 15 from the input summing junction 8 of the glide slope integrator. The synchronizing path is removed by this action and the glide slope integrator signal at this instant in time is fixed and can no longer change to drive the output signal at terminal 15 to zero for any change in the remaining input signals to summing junction 10. As the aircraft continues to fly toward the glide slope zero plane (see FIG. 2), the fly up command from glide slope error detector 4 is reduced in magnitude thus creating an error signal at system output terminal 15 in a fly down command direction which comprises the stored fly down signal from glide slope integrator 9 and the decreased fly up signal from glide slope error detector 4. The fly down command error signal at the output terminal 15 causes the elevator control system to cause displacement in a direction causing the aircraft to descend. This displacement of elevator surfaces in the control system is coupled by surface feedback measuring means 16 to null the system output command signal voltage at system output terminal 15. The aircraft rate of descent signal voltage provided by altitude rate detector 2 and the aircraft rate of acceleration signal voltage provided by detector means 1 (comprising an accelerometer having sensitive axis mounted normal to the desired flight path) shown in FIG. 10 (and in complete detail in FIG. 11) sense that the aircraft is descending and these two signal voltages are summed and coupled through lag filter means 17 (comprising a low pass lag filter, e.g., a resistor in parallel with a capacitor in feedback circuit of an operational amplifier) to produce a signal which is referenced to the aircraft flight path for short period maneuvering and to the aircraft vertical rate of descent for long term maneuvering. This uniquely derived signal is obtained by combining at adder 135 (comprising, e.g., a summing junction); higher frequency signal components from an accelerometer 1 which is tilted physically in the aircraft such that its sensing axis is disposed perpendicular to the flight path of the aircraft and which is positioned forward of the center of gravity of the aircraft (as shown in FIG. 11) which transmits these higher frequency signal components through high pass filter circuit 131 and summing resistor 132, and lower frequency components from an altitude rate signal source 2 which is reference to vertical rate of descent. As the aircraft descends, the output signal from lag filter 17 having the above higher and lower frequency signal components is representative of a fly down response in the system or a deviation from the aircraft flight path available through the circuit path coupled to junction 20 to null or cancel the signal voltage representative of commanded deviation from the aircraft flight path 119.

The results of the above described method of acquiring the glide slope zero plane is a fly down (or fly up if approaching from above the glide slope zero plane) altitude rate command signal voltage proportional to the error between the stored glide slope error signal voltage at the output of glide slope integrator circuit 9 and the actual glide slope error signal voltage generated by glide slope error detector 4. In this manner this unique feature of the present pitch axis control system provides a means for acquiring the glide slope zero plane which is substantially independent of external factors such as aircraft speed, glide slope zero plane angles, and glide slope error signal gradients. The above feature is accomplished by utilizing only one signal generating means for both glide slope capture and tracking functions.

The above described pitch axis control system provides a flight path command signal at the system output terminal 15 which positions the aircraft on a flight path to exponentially acquire the glide slope zero plane, and it will be further noted that the closing of the switch 12 (to the position shown by the dotted line) also couples in series circuit path glide slope gain programmer circuit 11 and gain 144 between glide slope error detector circuit 4 and summing junction 8 thereby providing a means for varying the stored glide slope error signal present at the output of glide slope integrator 9 during the glide slope acquisition maneuver and subsequent glide slope zero plane tracking to thereby eliminate errors developed in the flight path command signal present at system output terminal 15 and as a consequence cause the aircraft to acquire and track the zero plane of the glide slope error signal. The glide slope integrator output signal voltage from integrator circuit 9 at this time is proportional to but of opposite polarity to the descent rate signal voltage of the aircraft at low pass lag filter 17 which relationship is required to maintain the glide slope error signal voltage at glide slope error detector 4 equal to zero.

The damping terms for the pitch axis control system of FIG. 10 are derived in a novel and unique manner by mounting of the accelerometer 1 in the manner shown in FIG. 11, viz., normal to the flight path and forward of the aircraft center of rotation such that the output of accelerometer circuit 1 comprises: a signal voltage component $dV_n/dt$ proportional to the time rate of change of the aircraft velocity normal to the desired flight path; and, voltage component $\iota$ $(d\theta/dt)$ $cos\alpha\upsilon$ proportional to the rate of change of aircraft pitch attitude rate, and which is also insensitive to the time rate of change of the aircraft's velocity tangential to the flight path $dv_p/dt$. An additional "versine" signal 136 derived in a manner well-known in the state of the art is generated from roll angle sensor 140 to compensate the accelerometer sensor 139 and eliminate the effects of the versine term $g[1-\cos\theta/\cos\theta]$ inherent in a body mounted accelerometer. The output signal voltage from accelerometer circuit 1 is processed through lag filter 17 which provides an output signal voltage which is proportional to time rate of change of aircraft pitch attitude $d\theta/dt$ and velocity normal to flight path, $V_n$. A second circuit path is provided in series circuit between accelerometer 1 and system output terminal 15 by means of lag filter 18 connected in parallel with lag filter 17 to provide a further output signal voltage which is proportional to the output of accelerometer 1 normal to flight path. In this manner, the critical damping terms necessary for stability of the aircraft when flying an approach and landing are derived from the single source (accelerometer 1) thereby increasing the reliability of the system by reducing the number of critical component sensors necessary in the achievement of safe stability margins.

The pitch rate voltage signal source utilized is pitch rate detector 3 which is coupled in series circuit through band pass filters 111 and summing resistor 113 to summing junction 10 to provide an additional damping term in the system output signal voltage at output terminal 15 by summation through summing junction 10. This damping term is not critical in affecting aircraft or flight path stability.

A further feature of the presently described pitch axis control system of FIG. 10 provides a unique and novel means of allowing a glide slope acquisition maneuvers at substantially any distance from the landing runway (or from substantially any altitude above the runway). This aspect of the system hereinafter described has important considerations in connection with noise abatement approaches wherein it is desirable to acquire the glide slope zero plane as close to the desired landing point on the runway as possible to avoid long approaches over populated areas. In this respect, the system embodiment of FIG. 10 utilizes a vertical beam sensing means 66 (e.g., a threshold detector) which is located downstream in terms of signal processing from the gain programmer circuit 11. The gain programmer circuit 11 varies the glide slope error signal gain path (which includes the coupling of glide slope error detector 4, gain programmer circuit 11, lag filter means 115 (comprising a low pass filter) and summing resistor 117 in series circuit path to summing junction 119) to convert the angular glide slope error signal voltage from glide slope detector 4 into an error signal voltage which is proportional to distance from the glide slope zero plane. In this manner, the response of the system of FIG. 10 to glide slope errors is maintained constant at substantially any altitude down to that altitude level at which the programmer output signal voltage from programmer circuit 11 is programmed to zero immediately prior to flaring of the aircraft. Since vertical beam sensor 66 is coupled in circuit between the glide slope gain programmer circuit 11 and the system output terminal 15 (downstream of the glide slope gain programmer circuit 11 in terms of signal processing) the present system of FIG. 10 can maintain a substantially constant distance from the glide slope zero plane for system activation irrespective of the distance from the runway that the system is engaged. This means that for low altitude glide slope acquisitions, the vertical beam sensor 66 detection threshold is exceeded for greater error output signal voltages from glide slope error detector 4 than does for higher altitude glide slope acquisitions which results in an aircraft maneuver and flight path performance which is substantially identical for both high and low altitude captures. This unique and novel feature allows the present automatic approach and landing pitch axis control system to be utilized in the above manner for noise abatement approaches heretofore not possible.

A unique and novel flare command is provided by the present system which is switchless and provides tighter control of landing dispersions along the runway. The flare command signal voltage at circuit connection 19 in the series circuit comprising: altitude above terrain detector 5 connecting through limiter circuit 6 (comprising voltage limiting means, e.g., a saturated amplifier), the parallel combination of altitude rate circuit 21 comprising a high pass filter and altitude path displacement circuit 20 comprising a summing resistor proportional to displacement gain to summing junction 7, asymmetrical limiter circuit 125, circuit connection 19, summing resistor 127 to adder 129, adder 119, summing junction 10, and amplifier means to system output terminal 15, is a flare command having a flare point and a touchdown rate of descent command which are varied automatically by mechanization of the control laws to provide a tight control of the aircraft landing dispersions due to environmental conditions such as winds, terrain and varying aircraft flight parameter such as gross weight, center of gravity, flap configuration, and speed. The output voltage of the altitude terrain detector 5 is limited by limiter circuit 6 at an altitude so that large irregularities in terrain distant from the normal flare point of the aircraft approaching the landing runway do not affect the flare computation. Above the predetermined altitude for which the limiter is set, the output of limiter circuit 6 is a fixed parameter, i.e., not varying with time. The output voltage from altitude rate circuit 21 is zero since the input voltage to circuit 21 is not time varying, and the input voltages to summing junction 7 comprise the predetermined level output voltage from voltage limiter circuit means 6 coupled through altitude path displacement circuit 20 which provides displacement path voltage amplification and the zero voltage output of altitude rate circuit 21. The input of the flare command signal voltage at lead 22 transmitted to summing junction 10 is limited by asymmetrical limiter circuit 125 such that for positive summation of the input voltages to summing junction 7, no change in the output level of limiter circuit 125 can occur.

As the aircraft descends below the altitude at which the input voltage to limiter circuit 6 causes saturation the output voltage of limiter circuit 6 decreases in a manner proportional to altitude above the terrain. The output voltage from rate circuit 21 senses the rate of change of altitude with time and when the sum of the output voltages of rate circuit 21 and altitude displacement circuit 20 coupled into summing junction 7 is negative in polarity, the output voltage 19 from asymmetrical limiter circuit 125 is a command signal voltage on lead 22 coupled to summing junction 10 representative of a decreasing altitude rate command. The preceding circuit feature enables an aircraft which is descending at a high sink rate to begin to command a flare maneuver sooner than an aircraft descending at a lower sink rate. As the aircraft enters the flare region and approaches touchdown, heretofore, wind gusts or misapplication of thrust by the pilot have caused the aircraft to "float" however in accordance with the above discussed features of the present system, the flare command touchdown sink rate is caused to vary as a function of time in order to reduce increased landing dispersion normally experienced under the above and other conditions. As the aircraft begins to decrease its sink rate prior to touchdown, the rate circuit 21 output voltage begins to decrease. If the aircraft begins to "float" (i.e., approaches zero sink rate) at some altitude above the runway, the summed output voltage from summing junction 7 decreases due to the decreasing voltage from rate output circuit 21 hence decreasing flare command called for by the flare command signal voltage on lead 22 thereby causing the aircraft to increase its rate of sink for reducing touchdown dispersion.

The present system control laws discussed earlier as implemented in the present system embodiment allow generation of a switchless flare command not susceptible to switch failure prohibiting flare and further allow touchdown dispersions due to environmental and aircraft parameters to be minimized in the manner hereinbefore discussed.

In addition to the preceding, the present system includes circuit features which generate an automatic go-around command signal voltage at the output of adder 23 which is generated in a manner such that as the aircraft enters the flare region an additional go-around command signal voltage is generated as a portion of the switchless flare command signal voltage present on lead 22 to reduce the altitude loss during the go-around maneuver. The features of the go-around circuitry which are unique in the present system are that all of the same circuit components utilized in conducting the approach are utilized which are already known operative prior to initiation of go-around. Activation of the go-around (G/A) switch 24 by the pilot causes switch 14 to move to the open position (shown by dotted line) thereby reducing the output of the glide slope gain programmer circuit 11 to zero and further cuasing switch 13 to close (shown by the dotted line). Closing switch 13 connects together summing junction 8 and 23 which results in conversion of glide slope integrator circuit 9 into a lag circuit through gain 142 with time constant $\tau = 1/K_8$. Since the output voltage from the glide slope integrator circuit 9 is proportional to the actual descent rate of the aircraft and is representative of a fly down command, the closing of switch 13 causes subsequent "washout" elimination in the output of integrator circuit to a resultant zero fly down command thereby causing an error signal to be generated at summing junction 10 to cause the aircraft to break its sink rate and assume level flight. If the aircraft is in the flare region, the flare command signal voltage present on lead 22 will command the aircraft to climb to an altitude equivalent to the previously referred to flare initiation altitude and then amintain that altitude. These unique circuit features provide a go-around maneuver which is fail safe in the sense that it uses "known to be operating" components and does not require the introduction of a second signal source to initiate the go-around maneuver (as is the case in the FIG. 1 system representative of the prior art), place the aircraft in level flight and maintain an altitude above the flare region.

A predetermined voltage level is provided by go-around bias source 26 which is summed into summing junction 23 thereby causing the output signal voltage of glide slope integrator circuit 9 to command a climb rate when switch 13 is closed.

Those skilled in the art will appreciate the important and significant feature of the present system which provides a go-around command which is fail safe in that it cannot inhibit a normal flare of the aircraft if it fails and the further important feature that the system cannot cause a nose down hardover situation as a result of failed components within the go-around circuitry and the further feature that the initial go-around maneuver utilizes the same signal generating means already known to be operative.

Figure 12:
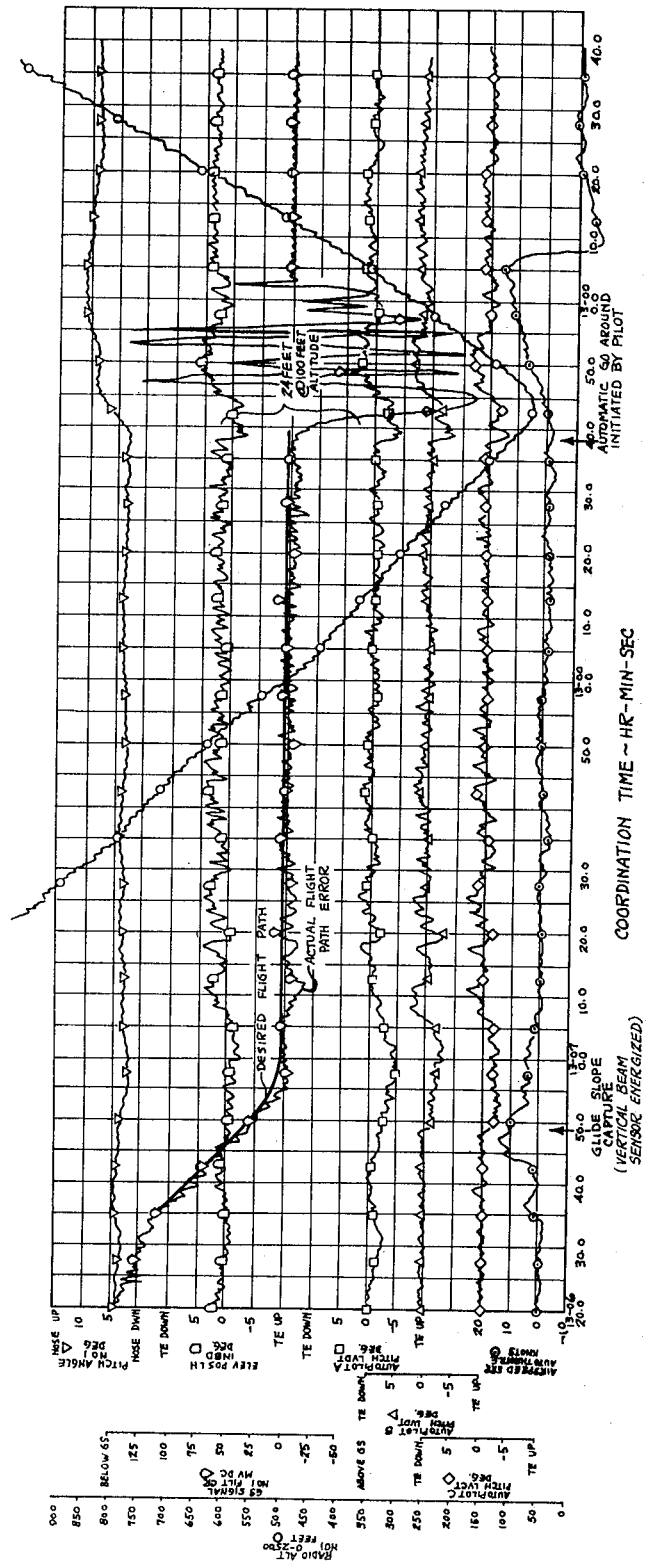
FIG. 12 is an actual plot showing actual flight path compared to desired flight path illustrative of the present pitch axis control system performance during glide slope capture tracking and go-around.
Figure 13:
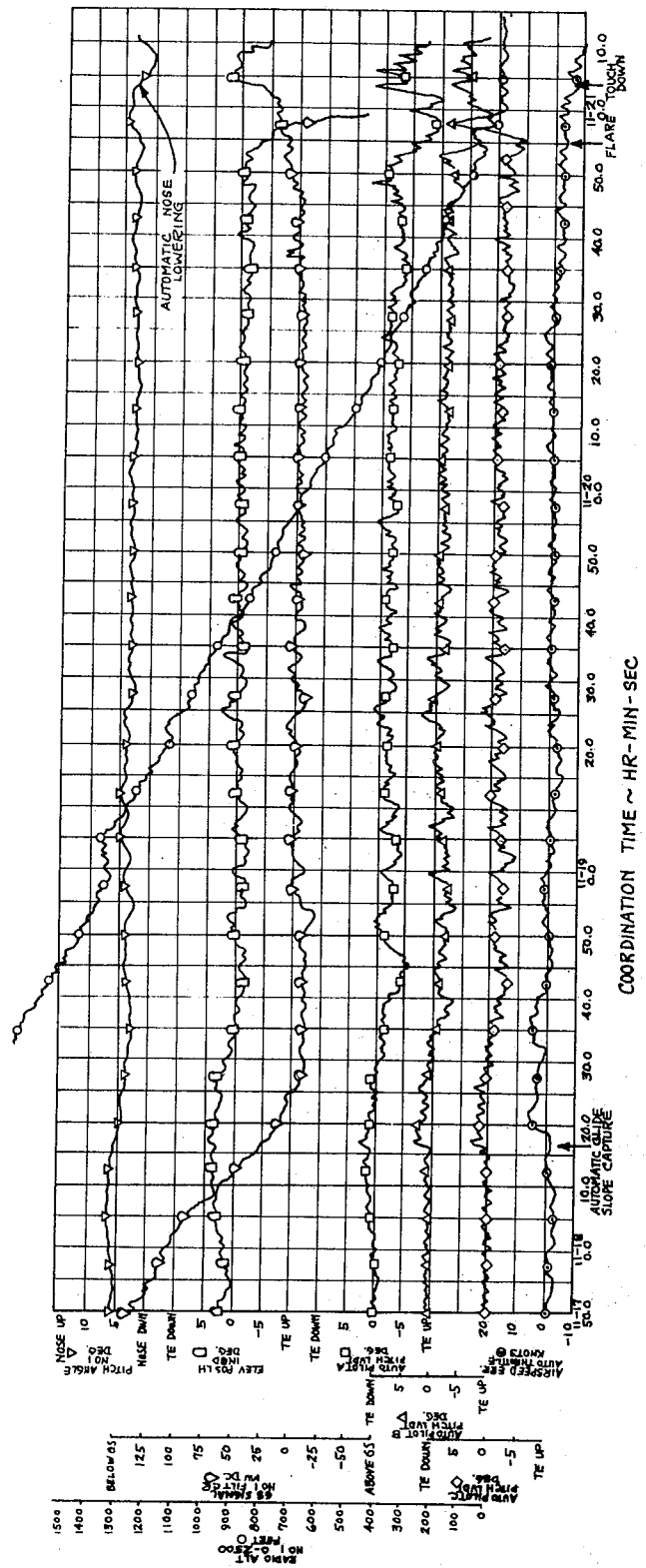
FIG. 13 is an actual plot showing pitch axis control system performance including flare, touchdown and automatic nose lowering.

FIG. 12 is a plot of actual airplane performance during a glide slope acquisition, track and subsequent pilot initiated automatic go-around for a Boeing 747. As can be seen the principles of this invention provide smooth and accurate acquisition of the glide slope zero plane (represented by zero glide slope error on the plot) and accurate tracking of the glide slope zero plane, and smooth and accurate go-around maneuver.

FIG. 12 includes automatic landing. Again the glide slope tracking accuracy prior to flare can be measured to be inches by those skilled in the art. The automatic nose lowering feature after touchdown can be seen to be smooth providing the pilot the opportunity to keep his attention on the task of stopping the airplane while the autopilot performs the task of keeping the airplane on the ground.

What is claimed is:

1. In combination in a pitch axis control system for an aircraft:
   first means for providing a first signal representative of the altitude rate of said aircraft:
   second means for generating a second signal representative of the desired change in said aircraft altitude rate during a go-around maneuver;
   third means including series switching means for coupling said second signal to lag circuit means for producing a third signal representative of commanded change in altitude rate during said go-around;
   fourth means for generating a fourth signal representative of the altitude rate of said aircraft at the initiation of said go-around maneuver;
   fifth means for combining said first signal, said third signal, and said fourth signal, and wherein said first signal nulls or cancels said third signal and said fourth signal thereby providing a fifth signal representative of the altitude rate error of said aircraft during a go-around manuever.

2. The invention according to claim 1 further comprising sixth means including longitudinal control actuator means coupled between said fifth means and the control surfaces of said aircraft and control surface position sensing means coupled between said control surfaces and said fifth means.

3. The invention according to claim 1 wherein said second means comprises:
   a signal source representative of desired altitude rate during go-around;
   a signal source representative of altitude rate existing at the initiation of go-around; and,
   means for combining the outputs of said signal sources to provide said second signal.

4. The invention according to claim 1 wherein said third means comprises:

series switching means coupled to the output of said second means, said switching means actuated upon initiation of go-around; and, lag circuit means coupled to the output of said series switching means, said lag circuit means having the transfer function $F(s) = 1/(TS + 1)$, wherein T is the time constant of the go-around maneuver and S is the laplace operator to provide said third signal.

5. The invention according to claim 1 wherein said fourth means comprises:

glide slope detector means providing a signal representative of glide slope error signal;

further series switching means coupled to said glide slope detector means; and, integrator circuit means coupled to the output of said series switching means, said further series switching means actuated upon initiation of go-around for removing said glide slope error signal from the input of said integrator circuit means to provide said fourth signal.

6. The invention according to claim 1 wherein said fifth means provides a fifth signal representative of h° error, where h° error as a function of time during go-around equals $$h^o_{(t)} + \Delta h^o(1-e^{-t/T}) - h_o$$

wherein $h^o_{(t)}$ is representative of said first signal $\Delta h^o(1-e^{-t/T})$ is representative of said third signal $h^o_o$ is representative of said fourth signal, and T is representative of the time constant of said lag circuit.

7. The invention according to claim 2 further comprising acceleration normal to flight path detector means and band pass filter means coupled in series circuit with said fifth means.

8. The invention according to claim 7 further comprising pitch rate detector means and further band pass filter means coupled in series circuit with said fifth means.

9. In combination in a pitch axis control system for providing a signal at an output terminal representative of the error between the commanded go-around altitude rate and the altitude rate of an aircraft;

glide slope detector means;

glide slope gain programmer means;

first switching means;

first adder circuit means;

said glide slope gain programmer means and said first switching means coupled in series circuit path between said glide slope detector means and said first adder circuit means, and wherein said first switching means is responsive to initiation of go-around of said aircraft thereby decoupling said glide slope detector means from said first adder circuit means integrator circuit means;

second adder circuit means;

said integrator circuit means coupled between said first adder circuit and said second adder circuit means;

third adder circuit means;

second series switching means;

said third adder circuit means and said second series switching means coupled between the output of said integrator circuit means and said first adder circuit means and wherein, said second series switching means is responsive to initiation of go-around of said aircraft thereby coupling said third adder circuit means to said first adder circuit means;

altitude rate command circuit means;

said altitude rate command circuit means coupled to said third adder means;

altitude rate detector means;

said altitude rate detector means coupled to said second adder means;

amplifier circuit means;

said amplifier circuit means coupled between said second adder circuit means and said output terminal.

10. The invention according to claim 9 further comprising lag circuit means coupled between said first series switching means and said second adder circuit.

11. In combination in a pitch axis control system for an aircraft;

glide slope detector means;

glide slope gain programmer means;

first switching means;

first adder circuit means;

said glide slope gain programmer means and said first switching means coupled in series circuit between said glide slope detector means and said first adder circuit means, whereby said first switching means is responsive to initiation of go-around of said aircraft thereby decoupling said glide slope detector means from said first adder circuit means;

integrator circuit means;

second adder circuit means;

said integrator circuit means coupled between said first adder circuit and said second adder circuit means;

third adder circuit means;

second series switching means;

said third adder circuit means and said second series switching means coupled between the output of said integrator circuit means and said first adder circuit means wherein said second series switching means is responsive to initiation of go-around of said aircraft, thereby coupling said third adder circuit means to said first adder circuit means;

go-around altitude rate command circuit means;

said go-around altitude rate command circuit means coupled to said third adder means;

altitude rate detector means;

said altitude rate detector means coupled to said second adder means;

amplifier circuit means;

longitudinal control actuator means;

said amplifier circuit means coupled between said second adder circuit and said longitudinal control actuator means;

longitudinal control actuator feedback measuring means; and said longitudinal control actuator feedback measuring means coupled between the output of said longitudinal control actuators and said second adder circuit means.

12. The invention according to claim 11 further comprising;

acceleration normal to flight path detector means;

first band pass filter circuit means;

said first band pass filter circuit means coupled between said acceleration normal to flight path detector means and said second adder circuit means;
pitch rate detector means;
second band pass filter circuit means;
said second band pass filter circuit means coupled between said pitch rate detector means and said second adder circuit means.

13. In combination in a pitch axis control system for an aircraft:
first means for providing a first signal representative of the altitude rate of said aircraft;
second means for generating a second signal representative of the desired change in said aircraft altitude rate during a go-around maneuver;
third means including series switching means for coupling said second signal to lag circuit means for producing a third signal representative of commanded change in altitude rate during said go-around;
fourth means for generating a fourth signal representative of the altitude rate of said aircraft at the initiation of said go-around maneuver;
fifth means for combining said first signal, said third signal, and said fourth signal, and wherein said first signal nulls or cancels said third signal and said fourth signal thereby providing a fifth signal representative of the altitude rate error of said aircraft during a go-around maneuver;
said second means comprising:
a signal source representative of desired altitude rate during go-around;
a signal source representative of altitude rate existing at the initiation of go-around;
means for combining the outputs of said signal sources to provide said second signal; and,
said second means further including a signal source representative of an additional desired change in altitude rate below a predetermined altitude of an approach to minimize the altitude loss of said aircraft during the go-around maneuver.

* * * * *